(12) United States Patent
Son

(10) Patent No.: US 10,600,036 B2
(45) Date of Patent: Mar. 24, 2020

(54) WIND POWER PLANT MANAGEMENT SYSTEM AND METHOD THEREOF

(71) Applicant: DOOSAN HEAVY INDUSTRIES & CONSTRUCTION CO., LTD., Changwon-si (KR)

(72) Inventor: Jong Duk Son, Suwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 745 days.

(21) Appl. No.: 14/813,842

(22) Filed: Jul. 30, 2015

(65) Prior Publication Data

US 2016/0034856 A1 Feb. 4, 2016

(30) Foreign Application Priority Data

Jul. 31, 2014 (KR) .......................... 10-2014-0098149

(51) Int. Cl.
*F03D 17/00* (2016.01)
*F03D 7/02* (2006.01)
(Continued)

(52) U.S. Cl.
CPC ............ *G06Q 10/20* (2013.01); *F03D 17/00* (2016.05); *F03D 80/50* (2016.05); *G05B 13/048* (2013.01);
(Continued)

(58) Field of Classification Search
CPC ........... G06Q 10/20; F03D 17/00; F03D 7/02; G05B 23/02
See application file for complete search history.

(56) References Cited

U.S. PATENT DOCUMENTS 6,975,925 B1 * 12/2005 Barnes .................... F03D 7/048
    700/286
8,335,731 B1 * 12/2012 Heller .................... G06Q 40/00
    705/35

(Continued)

FOREIGN PATENT DOCUMENTS

EP      2 267 305 A2    12/2012
JP      2009-243428 A   10/2009
(Continued)

OTHER PUBLICATIONS

Haddad et al., "An Options Approach for Decision Support of Systems with Prognostic Capabilities," IEEE Transactions on Reliability, IEEE Service Center, Piscataway, NJ, US, 61(4):872-883 (Dec. 1, 2012).

(Continued)

*Primary Examiner* — Nga B Nguyen
(74) *Attorney, Agent, or Firm* — Invenstone Patent, LLC

(57) ABSTRACT

Provided is a wind power generation management apparatus including: a collection unit configured to collect first data generated in a wind power plant; a fault occurrence prediction unit configured to compare the collected first data with a predefined normal state model, to create a second data indicating a state of the wind power plant based on a result of the comparison, and to predict occurrence of a fault in the wind power plant according to the second data; and a maintenance plan establishment unit configured to estimate an operating time corresponding to a time from a start of the wind power plant until the fault occurs, and to generate a maintenance plan which can be performed for the fault during the estimated operating time.

7 Claims, 6 Drawing Sheets

(51) Int. Cl.
*G06Q 10/00* (2012.01)
*G05B 23/02* (2006.01)
*G05B 13/04* (2006.01)
*F03D 80/50* (2016.01)

(52) U.S. Cl.
CPC ...... *G05B 23/0283* (2013.01); *F05B 2260/84* (2013.01); *Y02E 10/72* (2013.01)

(56) References Cited

U.S. PATENT DOCUMENTS

| | | | | |
|---|---|---|---|---|
| 2004/0230377 | A1* | 11/2004 | Ghosh | F03D 7/0284 702/3 |
| 2010/0280673 | A1* | 11/2010 | Woste | G05B 19/0428 700/287 |
| 2011/0125419 | A1 | 5/2011 | Bechhoefer et al. | |
| 2011/0276828 | A1* | 11/2011 | Tamaki | G05B 23/0254 714/26 |
| 2011/0313726 | A1* | 12/2011 | Parthasarathy | G05B 23/024 702/179 |
| 2012/0046917 | A1* | 2/2012 | Fang | G01W 1/10 703/1 |
| 2012/0143565 | A1* | 6/2012 | Graham, III | G05B 23/0237 702/181 |
| 2012/0290104 | A1* | 11/2012 | Holt | G06Q 10/00 700/29 |
| 2013/0035798 | A1* | 2/2013 | Zhou | F03D 7/0292 700/287 |
| 2013/0253853 | A1* | 9/2013 | Wunderlin | G05B 23/0283 702/42 |
| 2013/0332220 | A1 | 12/2013 | Nielsen | |
| 2014/0244051 | A1* | 8/2014 | Rollins | B01F 3/04078 700/282 |
| 2014/0244328 | A1* | 8/2014 | Zhou | G06Q 10/20 705/7.13 |
| 2014/0288855 | A1* | 9/2014 | Deshpande | F03D 17/00 702/34 |
| 2015/0101401 | A1* | 4/2015 | Ekanayake | G01W 1/02 73/112.01 |

FOREIGN PATENT DOCUMENTS

| | | |
|---|---|---|
| JP | 2013-11232 A | 1/2013 |
| KR | 10-2012-0059874 A | 6/2012 |
| KR | 10-2013-0026107 A | 3/2013 |
| KR | 10-2013-0031344 A | 3/2013 |
| KR | 10-2014-0054682 A | 5/2014 |

OTHER PUBLICATIONS

Communication dated Jun. 17, 2016 from the European Patent Office in counterpart Application No. 15 17 9274.4-1807.

* cited by examiner

WIND POWER PLANT MANAGEMENT SYSTEM AND METHOD THEREOF

CROSS-REFERENCE TO RELATED APPLICATION

This application claims priority from Korean Application No. 10-2014-0098149, filed Jul. 31, 2014 in the Korean Intellectual Property Office, the disclosure of which are incorporated herein by reference in its entirety.

BACKGROUND

Field

Methods and apparatuses consistent with exemplary embodiments relate to a wind power plant management system and a method thereof, and more specifically, to a wind power plant management system and a method thereof for managing a wind power plant based on work environment data (raw data) collected in the wind power plant.

Background of the Related Art

Demands on eco-friendly next-generation power generation facilities continue to grow due to depletion of fossil fuels and riskiness of nuclear power generation.

Wind power generation is a most rapidly growing sector among renewable energy sources used for generation of electric power, and the electric power generated by newly constructed wind power plants occupies a large portion of the total power production.

Wind power generation is a technique of converting kinetic energy of air into mechanical energy and obtaining electricity from the mechanical energy, and a wind generator generates electric power by converting mechanical kinetic energy generated by movement of a rotor shaped like a wing into electrical energy according to aerodynamics.

Wind power generation industry in the United States set a goal of increasing 35 GW of annual installation capacity by the end of year 2009. However, this capacity is a numerical value remaining at a 2% level of total energy demand in the United States during the same period (total demand of power in the United States is 1.75 TW in 2009, and total power demand in Korea is at a level of 80 GW). Therefore, Department of Energy (DOE) in the United States requests the wind power generation industry to accomplish 20% of the total energy demand through wind generation by the year 2030. However, in order to accomplish such an object, a wide range of research and development is required in a variety of fields such as design, manufacture, installation, operation & management (O&M) and the like.

Particularly, a technique of prognosing failure of a wind power plant may play an important role so that wind power generation may guarantee further reliable and extensive generation of energy. A large consensus on the need of a fault prognosis technique is currently formed in the European Wind Energy Association (EWEA), and if such a fault prognosis technique is properly implemented, it is expected that suspension of power generation or propagation of a fault to important components can be prevented by sensing a degree of ageing or abrupt generation of an abnormal situation in the wind power plant at an early stage.

(Patent Document 1) Prior Technique 1: Korean Laid-opened Patent No. 2013-0026107: Wind power generation system and control method thereof

SUMMARY

Therefore, the disclosure of exemplary embodiments has been made in view of the above problems, and it is an object of the exemplary embodiments to provide a wind power plant management system and a method thereof for predicting a fault of a wind generator and establishing a maintenance plan during an operating time which lasts until the predicted fault occurs.

Another object of the exemplary embodiments is to provide a wind power plant management system and a method thereof for sensing a fault of a wind generator based on data measured in a wind power plant and automatically controlling the wind generator in which the fault is sensed or informing a manager of information on the fault.

To accomplish the above objects, according to one aspect of an exemplary embodiment, there is provided a wind power generation management apparatus including: a collection unit for collecting work environment data (raw data) generated in a wind power plant; a fault occurrence prediction unit for comparing the collected work environment data with a predefined normal state model, creating a state data indicating a state of the wind power plant based on a result of the comparison, and predicting occurrence of a fault in the wind power plant according to the state data; and a maintenance plan establishment unit for estimating an operating time which lasts until the fault occurs and establishing a maintenance plan which can be performed for the fault during the estimated operating time.

The work environment data may include weather data including at least one of wind speed, wind direction, temperature and pressure of the wind power plant and work information acquired by a Supervisory Control And Data Acquisition System (SCADA System) or a Condition Monitoring System (CMS System).

The state data includes a fault occurrence prediction data (health data) indicating possibility of fault occurrence in the wind power plant, and the fault occurrence prediction unit may compare the collected work environment data with the predefined normal state model and, if there is a parameter existing outside a normal range, create the fault occurrence prediction data based on a trend of the corresponding parameter.

The wind power generation management apparatus may further include a normal state model creation unit for collecting work environment modeling data generated in the wind power plant to create the normal state model, extracting normal data by removing noises from the collected work environment modeling data, and creating the normal state model by recognizing a pattern of the extracted normal data.

The wind power generation management apparatus may further include an operating time information database for storing an operating time for each fault occurrence prediction data based on generator operation history and generator management performance (track records), and the maintenance plan establishment unit may estimate the operating time which lasts until the fault occurs based on the operating time information database.

The maintenance plan establishment unit may calculate maintenance cost for the established maintenance plan with reference to at least one of a fault occurrence probability, an equipment use fee, parts cost, labor cost and transport cost.

The maintenance plan establishment unit may determine a maintenance time point based on the operating time with reference to resources needed for maintenance of the fault, weather condition, availability of the resources, a time required to order the resources, or maintenance priorities of a plurality of faults so that maintenance for the fault can be completed within the estimated operating time.

In addition, the wind power generation management apparatus may further include a fault processing unit for determining a maintenance time point with reference to resources needed for maintenance of the fault, weather condition, availability of the resources, a time required to order the resources, or maintenance priorities of a plurality of faults so that the maintenance can be performed immediately if the state data indicates that a fault has already occurred.

In addition, the wind power generation management apparatus may further include a fault history management unit for provides fault history information including at least one of a fault status, a fault management priority, a fault cause and a maintenance plan when the fault history information of the wind generator is requested.

According to an aspect of another exemplary embodiments, there is provided a method of managing a wind power plant by a wind power generation management apparatus, the method including the steps of: collecting work environment data generated in the wind power plant; comparing the collected work environment data with a predefined normal state model, creating a state data indicating a state of the wind power plant based on a result of the comparison, and predicting occurrence of a fault in the wind power plant according to the state data; estimating an operating time which lasts until the fault occurs; and establishing a maintenance plan which can be performed for the fault during the estimated operating time.

The operating time which lasts until the fault occurs may be estimated based on an operating time information database in which an operating time for each fault occurrence prediction data based on generator operation history and generator management performance (track records) is stored.

The step of establishing a maintenance plan which can be performed for the fault during the estimated operating time may determine a maintenance time point based on the operating time with reference to resources needed for maintenance of the fault, weather condition, availability of the resources, a time required to order the resources, or maintenance priorities of a plurality of faults so that maintenance for the fault can be completed within the estimated operating time.

The method of managing a wind power plant may further include the step of collecting work environment modeling data generated in the wind power plant, extracting normal data by removing noises from the collected work environment modeling data, and creating the normal state model by recognizing a pattern of the extracted normal data.

Accordingly, maintenance of a wind power plant can be performed before a fault occurs by predicting occurrence of a fault in the wind power plant using work environment data measured in the wind power plant and establishing a maintenance plan so that the maintenance can be performed for the fault during an operating time which lasts until the fault occurs.

In addition, it is possible to sense a fault of a wind generator based on data measured in the wind power plant and automatically control the wind generator in which the fault is sensed or inform a manager of information on the fault.

According to an aspect of another exemplary embodiments, there is provided a wind power generation management apparatus including: a collection unit configured to collect first data generated in a wind power plant; a fault occurrence prediction unit configured to compare the collected first data with a predefined normal state model, to create a second data indicating a state of the wind power plant based on a result of the comparison, and to predict occurrence of a fault in the wind power plant according to the second data; and a maintenance plan establishment unit configured to estimate an operating time corresponding to a time from a start of the wind power plant until the fault occurs, and to generate a maintenance plan which can be performed for the fault during the estimated operating time.

The first data may include: weather data comprising at least one of wind speed, wind direction, temperature and pressure of the wind power plant and work information acquired by a Supervisory Control And Data Acquisition System (SCADA System) or a Condition Monitoring System (CMS System).

The second data may include a prediction data indicating possibility of fault occurrence in the wind power plant, and the fault occurrence prediction unit may be configured to compare the collected first data with the predefined normal state model and, in response to there being a parameter existing outside a first range, the fault occurrence prediction unit is configured to create the prediction data based on a trend of a corresponding parameter.

The apparatus may further include a normal state model creation unit configured to collect third data generated in the wind power plant to create the predefined normal state model, to extract fourth data by removing noises from the collected third data, and to create the normal state model based on a pattern of the extracted fourth data.

The apparatus may further include an operating time information database configured to store an operating time for each prediction data based on generator operation history and generator management performance, and the maintenance plan establishment unit may be configured to estimate the operating time corresponding to the time from the start of the wind power plant until the fault occurs based on the operating time information database.

The maintenance plan establishment unit may be configured to calculate maintenance cost for the established maintenance plan based on at least one of a fault occurrence probability, an equipment use fee, parts cost, labor cost and transport cost.

The maintenance plan establishment unit may be configured to determine a maintenance time point based on the operating time with reference to resources needed for maintenance of the fault, weather condition, availability of the resources, a time required to order the resources, or maintenance priorities of a plurality of faults so that maintenance for the fault can be completed within the estimated operating time.

The apparatus may further include a fault processing unit configured to determine a maintenance time point with reference to resources needed for maintenance of the fault, weather condition, availability of the resources, a time required to order the resources, or maintenance priorities of a plurality of faults so that the maintenance can be performed immediately in response to the state data indicating that a fault has already occurred.

The apparatus may further include a fault history management unit configured to provide fault history information including at least one of a fault status, a fault management priority, a fault cause and a maintenance plan in response to the fault history information of a wind generator of the wind power plant being requested.

According to an aspect of another exemplary embodiments, there is provided a method of managing a wind power plant by a wind power generation management apparatus, the method including: collecting first data generated in the wind power plant; comparing the collected first data with a predefined normal state model; creating a second data indicating a state of the wind power plant based on a result of the comparing; predicting occurrence of a fault in the wind power plant according to the second data; estimating an operating time corresponding to a time from a start of the wind power plant until the fault occurs; and generating a maintenance plan to be performed for the fault during the estimated operating time.

The estimating the operating time corresponding to the time from the start of the wind power plant until the fault occurs may include estimating the estimating the operating time corresponding to the time based on information stored in an operating time information database in which an operating time for each prediction data based on generator operation history and generator management performance is stored.

The establishing the maintenance plan may include: determining a maintenance time point based on the operating time with reference to resources needed for maintenance of the fault, weather condition, availability of the resources, a time required to order the resources, or maintenance priorities of a plurality of faults; and completing maintenance of the wind power plant for the fault within the estimated operating time.

The method may further include: collecting third data generated in the wind power plant; extracting fourth data by removing noises from the collected third data; and creating the predefined normal state model based on a pattern of the extracted fourth data.

DESCRIPTION OF SYMBOLS

Figure 1:
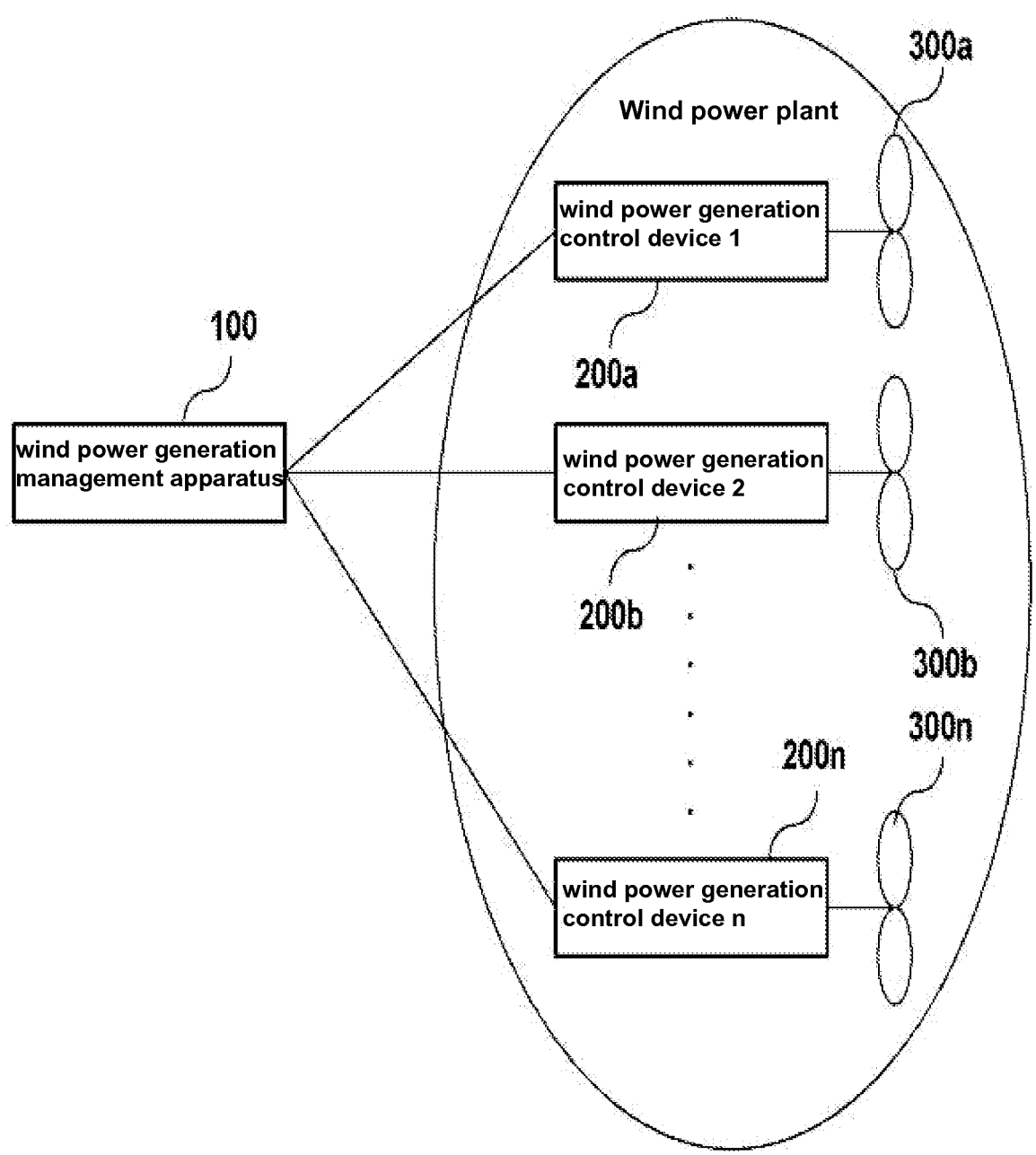
FIG. 1 is a view showing a wind power plant management system according an exemplary embodiment.

100: Wind power generation management apparatus
110: Communication unit
120: Database
130: Collection unit
140: Fault occurrence prediction unit
150: Maintenance plan establishment unit
160: Normal state model creation unit
170: Fault processing unit
180: Fault history management unit
190: Control unit
200: Wind power generation control device
210: Multi-sensor
220: Wind power generation control unit
300: Wind generator

DETAILED DESCRIPTION

Reference will be now made in detail to exemplary embodiments of the present disclosure with reference to the attached drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure.

Hereafter, 'a wind power plant management system and a method thereof' according to the exemplary embodiments will be described in detail with reference to the accompanying drawings. The disclosed exemplary embodiments are provided to enable those skilled in the art to easily understand the scope of the disclosure, and the inventive concept is not limited by such exemplary embodiments. Moreover, matters illustrated in the drawings are schematized in order to describe or explain the exemplary embodiments more easily, and hence, may be different from forms embodied actually.

Meanwhile, the constitutional components expressed below are merely examples for implementing the inventive concept. Accordingly, other components may be used in other implementations of the inventive concept without departing from the spirit and scope of the inventive concept. In addition, although each component can be implemented only in a pure hardware or software configuration, it also can be implemented by combining various hardware or software configurations performing the same function. In addition, two or more components may be implemented together by one piece of hardware or software.

In addition, the expression of 'including' an element is an expression of an 'open type' which merely refers to existence of a corresponding component, and it should not be construed as precluding additional components.

FIG. 1 is a view showing a wind power plant management system according an exemplary embodiment.

Referring to FIG. 1, a wind power plant management system includes wind power generation control devices 200a, 200b, . . . , 200n (hereinafter, referred to as 200) respectively connected to wind generators 300a, 300b, . . . , 300n (hereinafter, referred to as 300) and a wind power generation management apparatus 100 connected to the wind power generation control devices 200.

The wind power generation management apparatus 100 compares work environment data (raw data) measured in a wind power plant with a predefined normal state model and creates a state data indicating a state of the wind power plant based on a result of the comparison. Then, the wind power generation management apparatus 100 predicts occurrence of a fault in the wind power plant according to the state data, estimates an operating time which lasts until the fault occurs, and establishes a maintenance plan which can be performed for the fault during the estimated operating time. Here, the work environment data may include weather data including at least one of wind speed, wind direction, temperature and pressure, work information acquired by a Supervisory Control And Data Acquisition System (SCADA System) or a Condition Monitoring System (CMS System) and the like.

In addition, if the state data indicates that a fault has already occurred, the wind power generation management apparatus 100 informs a manager of occurrence of the fault, as well as scheduling a maintenance plan, so that the maintenance can be performed immediately.

In addition, if the state data indicates that a fault has already occurred, the wind power generation management apparatus 100 determines whether or not a corresponding wind generator is automatically controlled and transmits an automatic control signal to a corresponding wind power generation control device or transmits alarm information to a manager terminal according to a result of the determination. That is, if automatic control is set in the wind generator where the fault is generated or automatic control can be conducted on the wind generator, the wind power generation management apparatus 100 transmits an automatic control signal to a corresponding wind power generation control device. Here, the automatic control signal may include a control signal for automatic maintenance such as top-up of lubricant (of a yawing gear or a pitch control gear), generator coolant or the like, a control signal for safety mode operation (pitch control or rotation speed control) and the like. If automatic control is not set in the wind generator where the fault is generated or automatic control cannot be conducted, the wind power generation management apparatus 100 may transmit alarm information including information on the wind generator where the fault is generated (e.g., including identification information, location and the like of the wind generator), a fault cause, a fault management priority, facility maintenance cost, a maintenance time point and the like to the manager terminal. The manager terminal is a manager interface which can be connected to the wind power generation management apparatus 100 through a wired or wireless network and fetch and display various kinds of data and information stored in the wind power generation management apparatus 100, and, for example, it can be configured of various kinds of computer terminals such as a personal computer (PC), a desk-top computer, a lap-top computer and the like which can be connected to an Internet network through a wired or wireless network, various kinds of mobile terminals such as a cellular phone, a smart phone and the like which can be connected to an Internet network through a wired or wireless network, or the like.

At least one wind power generation management apparatus 100 is installed in a wind power plant in which a plurality of wind generators 300 is installed, and the wind power generation management apparatus 100 receives and collects various kinds of work information from the plurality of wind generators 300 and updates a database with the work information. In this way, the time required for recording a result of performing a maintenance and inspection work on a large number of wind generators 300 into the database can be reduced greatly.

The work information collected from the wind generators 300 includes work time information, work environment information and the like. The work time information includes a time performing a work in a specific work area of the wind generator 300 by a worker and information on the work area. The work environment information includes any one or more pieces of environment information including temperature, humidity and contamination inside or outside the wind generator 300. The work information like this may further include other related information on the wind generator 300 and the worker.

In order to collect the work information from the plurality of wind generators 300, a Supervisory Control And Data Acquisition System (hereinafter, referred to as a SCADA system) (not shown) is provided between the plurality of wind generators 300 and the wind power generation management apparatus 100 as a remote monitoring control unit, and communication between the plurality of wind generators 300 and the wind power generation management apparatus 100 is performed using the SCADA system. The SCADA system collects work information of each wind generator 300 through each wind power generation control device 200 using analog or digital signals on the communication path, and the wind power generation management apparatus 100 centrally monitors and controls the collected work information of the wind generators 300. The wind power generation management apparatus 100 constructs a database using the collected work information of the wind generators 300, updates contents of the database when new work information is collected, and manages maintenance and inspection history and the like of the plurality of wind generators 300 configuring the wind power plant by recording history of changes in the work information collected and updated like this.

Meanwhile, the wind power generation management apparatus 100 may communicate with other electronic devices through various communication specifications and can be implemented through an electronic device capable of performing various data processing operations. For example, the wind power generation management apparatus 100 can be implemented in the form of a server device, and it can be implemented in the form of various electronic devices other than the form of a server device. In addition, the wind power generation management apparatus 100 can be implemented in the form of a single electronic device or in a form combining two or more electronic devices.

Details of the wind power generation management apparatus 100 will be described with reference to FIG. 2.

The wind power generation control device 200 performs an operation corresponding to the automatic control signal transmitted from the wind power generation management apparatus 100. That is, the wind power generation control device 200 performs an operation for controlling a pitch drive, a yaw control device of a nacelle, a generator, a hydraulic device, a cooling device and the like of a corresponding wind generator 300 according to the automatic control signal.

Details of the wind power generation control device 200 will be described with reference to FIG. 5.

Such a wind power generation management apparatus 100 is interconnected with the wind power generation control device 200 through a communication network, and the communication network refers to a network capable of transmitting and receiving data in an Internet protocol using various wired and wireless communication techniques such as an Internet network, an intranet network, a mobile communication network, a satellite communication network and the like.

Figure 2:
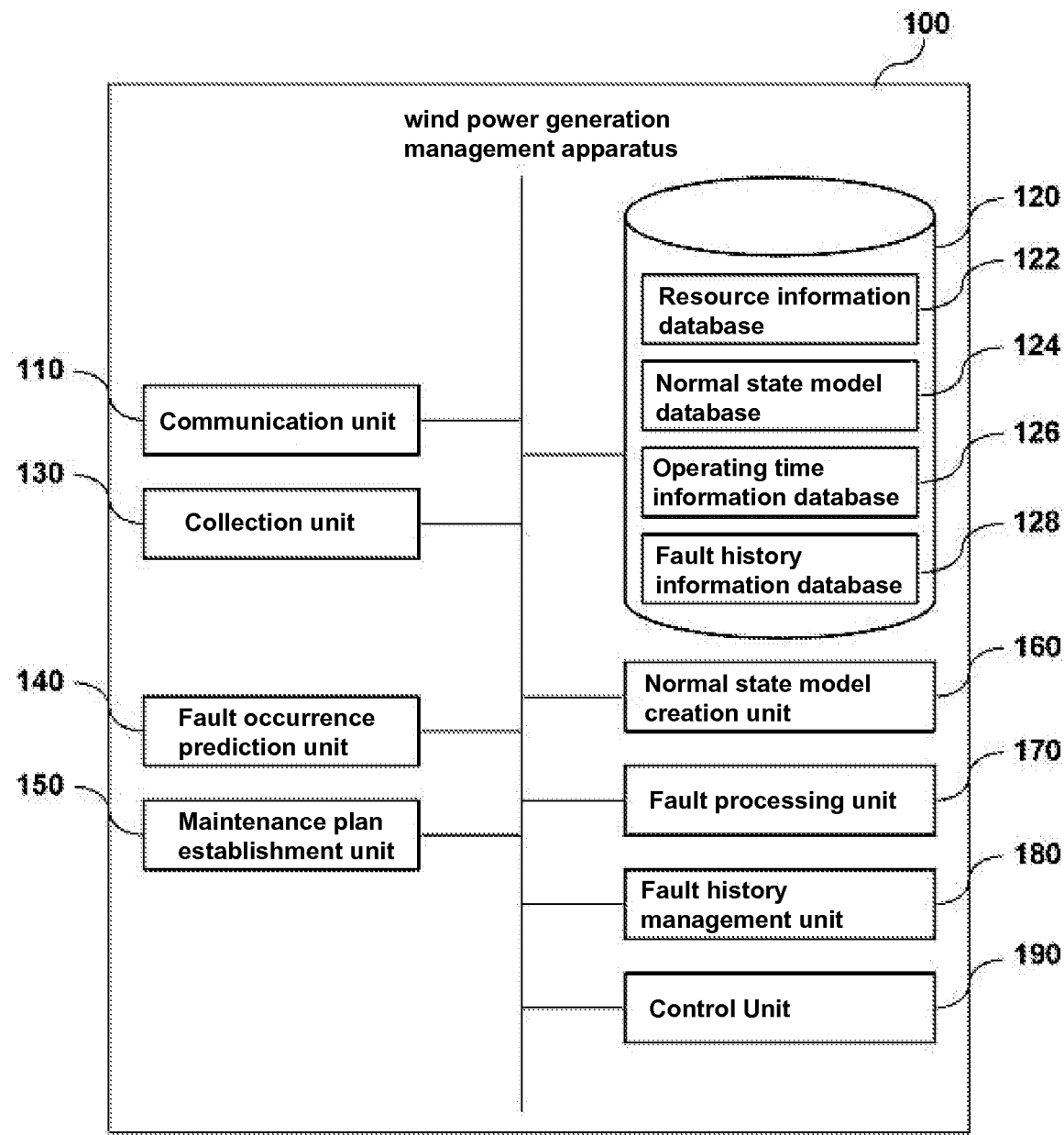
FIG. 2 is a block diagram schematically showing the configuration of a wind power generation management apparatus according an exemplary embodiment.
Figure 3:
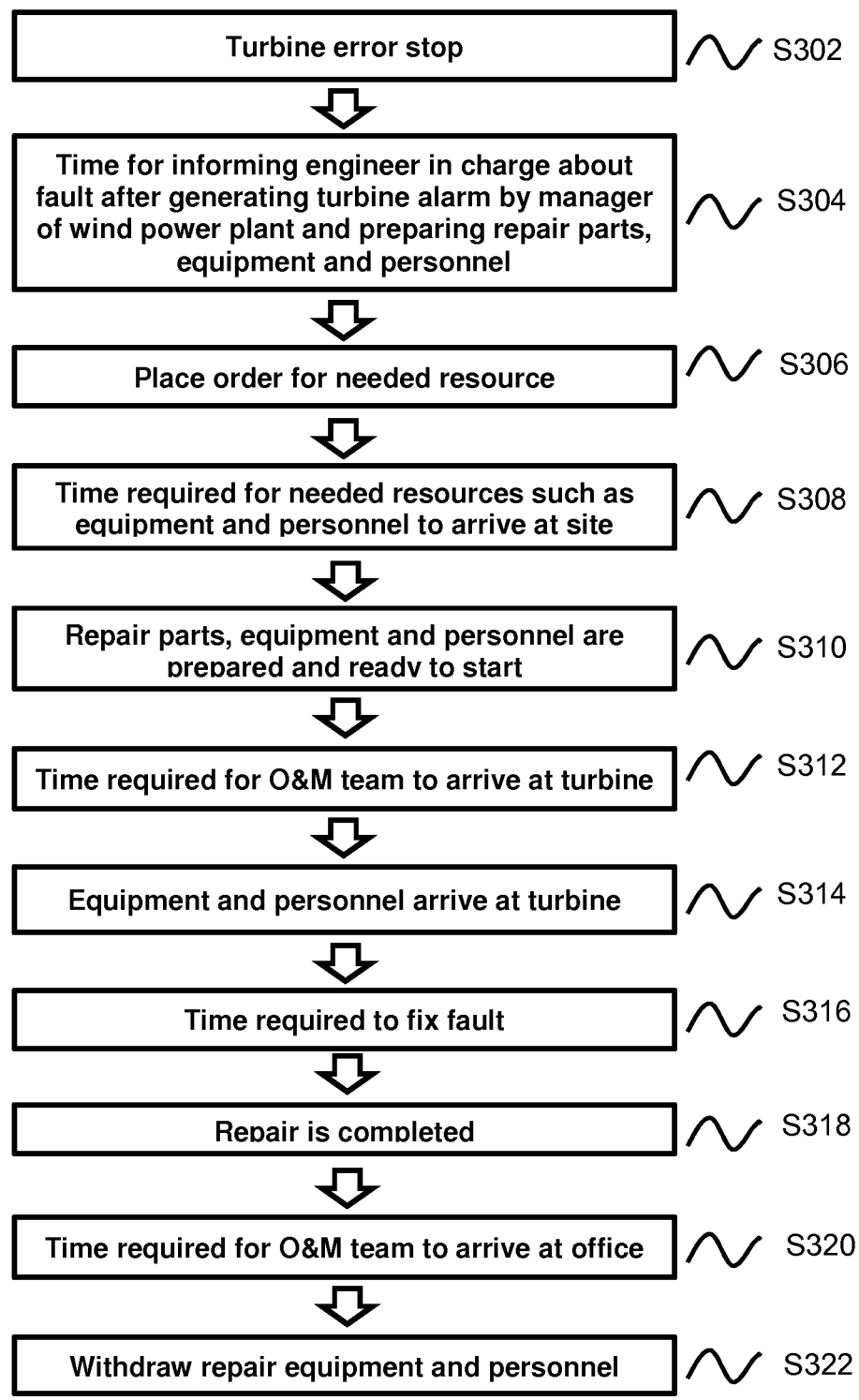
FIG. 3 is a view illustrating an onshore wind power generation maintenance scenario according an exemplary embodiment.
Figure 4:
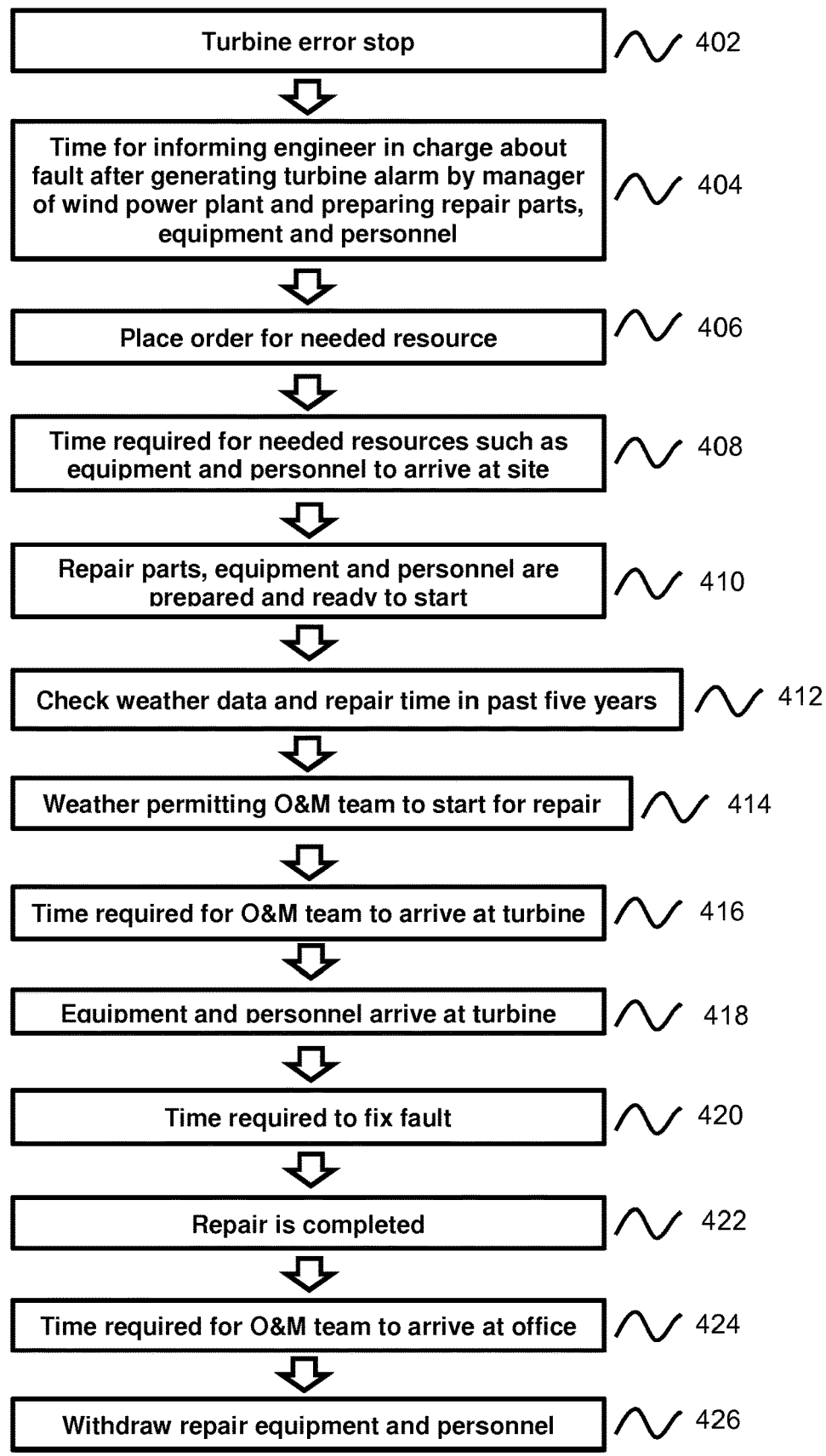
FIG. 4 is a view illustrating an offshore wind power generation maintenance scenario according an exemplary embodiment.

FIG. 2 is a block diagram schematically showing the configuration of a wind power generation management apparatus according an exemplary embodiment, FIG. 3 is a view illustrating an onshore wind power generation maintenance scenario according an exemplary embodiment, and FIG. 4 is a view illustrating an offshore wind power generation maintenance scenario according an exemplary embodiment.

Referring to FIG. 2, the wind power generation management apparatus 100 includes a communication unit 110, a database 120, a collection unit 130, a fault occurrence prediction unit 140, a maintenance plan establishment unit 150, a normal state model creation unit 160, a fault processing unit 170, a fault history management unit 180 and a control unit 190.

The communication unit 110 is a communication means for interconnecting the wind power generation management apparatus 100 with the wind power generation control device and the SCADA system through a communication network, which may include, for example, a wireless communication module for mobile communication, satellite communication or the like, a wired communication module for the Internet or the like and a near field wireless communication module for Wi-Fi or the like.

The database 120 includes a resource information database 122, a normal state model database 124, an operating time information database 126, a fault history information database 128 and the like.

Information on the resources such as parts, equipment and the like needed for maintenance of a wind generator is stored in the resource information database 122. For example, information on available resources is stored in the resource information database 122.

A normal state model created by the normal state model creation unit 160 is stored in the normal state model database 124. The normal state model can be updated at predetermined intervals.

An operating time for each fault occurrence prediction data based on generator operation history and generator management performance (track records) is stored in the operating time information database 126. Information on a time which lasts until a fault actually occurs (operating time) is recorded in the generator operation history and generator management performance (track records), for each fault occurrence prediction data.

Fault history information including a fault status, a fault management priority, a fault cause, a maintenance plan and the like is stored in the fault history information database 128. The fault status may include a device which generates a fault, a date when the fault is generated, whether or not the fault is fixed, a date fixing the fault and the like. The fault management priority is a priority indicating an order of preferentially performing maintenance among generated or predicted faults, types of faults at that time point, wind generators or devices configuring the wind generators, and it can be obtained using equation 1.

$$R = S*P*D*C \qquad [\text{Equation 1}]$$

Here, R denotes the fault management priority, S denotes fault severity, P denotes a fault occurrence probability, D denotes a fault sensing rate, and C denotes a customer request rate. The fault severity is a value assigned according to a degree of fault severity of each device configuring the wind generator, and the fault occurrence probability is a probability of fault occurrence calculated for each fault or device, which can be a value obtained using history or statistics of faults occurred during a predetermined period. The fault sensing rate is a value expressing fault sensing capability of each device, and, for example, the value may vary according to whether or not a sensor capable of sensing a fault is attached. The customer request rate has a value varying according to whether or not a customer requests the maintenance.

The collection unit 130 collects work environment data (raw data) generated in the wind power plant. Here, the work environment data may include weather data including wind speed, wind direction, temperature and pressure, work information (e.g., including a pitch angle and a yaw angle of a blade provided in the wind generator, a work diary, work environment information and the like) acquired by the SCADA System or the CMS System, and the like.

The fault occurrence prediction unit 140 compares the work environment data collected by the collection unit 130 with a predefined normal state model, creates a state data indicating a state of the wind power plant based on a result of the comparison, and predicts occurrence of a fault in the wind power plant according to the state data. Here, the state data includes a fault occurrence prediction data (health data) indicating possibility of fault occurrence in the wind power plant, and the fault occurrence prediction unit 140 compares the collected work environment data with the predefined normal state model and, if there is a parameter existing outside a normal range, creates the fault occurrence prediction data based on a trend of the corresponding parameter. The normal state model expresses a correlation between parameters, and the fault occurrence prediction unit 140 compares a value of each parameter measured in real-time with a value of the normal state model and, if there is a parameter existing outside a normal range as a result of the comparison, it may predict a fault by observing a correlation of a parameter having a high correlation with the corresponding parameter. At this point, the predicted fault can be a fault occurrence prediction data.

For example, if a parameter existing outside a normal range is temperature and a parameter having a high correlation with the temperature is pressure, the fault occurrence prediction unit 140 may predict a fault set according to a correlation between the temperature and the pressure.

The maintenance plan establishment unit 150 estimates an operating time which lasts until the fault occurs and establishes a maintenance plan which can be performed for the fault during the estimated operating time. At this point, the maintenance plan establishment unit 150 may estimate the operating time which lasts until the fault occurs based on generator operation history and generator management performance (track records) stored in the operating time information database 126. Because an operating time for each fault occurrence prediction data based on the generator operation history and the generator management performance (track records) is stored in the operating time information database 126, the maintenance plan establishment unit 150 may estimate the operating time which lasts until the fault occurs based on the operating time information database 126.

If an operating time is estimated, the maintenance plan establishment unit 150 establishes a maintenance plan so that maintenance can be completed within the operating time. At this point, the maintenance plan establishment unit 150 may establish the maintenance plan considering available resources, a fault management priority, weather condition (wave height and the like), the operating time and the like. That is, the maintenance plan establishment unit 150 determines a maintenance time point based on the operating time with reference to resources needed for maintenance of the fault, weather condition, availability of the resources, a time required to order the resources, or maintenance priorities of a plurality of faults so that the maintenance can be completed within the estimated operating time. At this point, if the weather condition or the availability of the resources is dissatisfied although the maintenance priority is high, the maintenance plan establishment unit 150 may determine the maintenance time point so that maintenance for a fault with favorable weather condition and available resources can be performed first.

For example, when the fault management priority is set in order of a gear, a shaft and a blade and the weather condition and the resources needed for maintenance are all satisfied, the maintenance plan establishment unit 150 may determine a maintenance order in order of the gear, the shaft and the blade. In addition, if the fault management priority is set in order of the gear, the shaft and the blade and it is estimated that five hours are required for maintenance of the gear, three hours for the shaft, seven hours for the blade and the operating time is three hours, the maintenance plan establishment unit 150 may determine the maintenance order by setting the highest priority to the shaft which can be fixed within the operating time, because the maintenance should be completed within the operating time. In addition, if the fault management priority is set in order of the gear, the shaft and the blade and the resources needed for maintenance are available for a fault occurred in the blade, the maintenance plan establishment unit 150 may determine the maintenance order by setting the highest priority to the blade.

Because a method of establishing an onshore maintenance plan is different from a method of establishing an offshore maintenance plan, they will be described separately.

First, a method of establishing an onshore wind power generation maintenance plan is described with reference to FIG. 3. Referring to FIG. 3, if a turbine error stop occurs (S302), the maintenance plan establishment unit 150 informs a manager and an engineer in charge about occurrence of the error after generating a turbine alarm and sets a preparation time for preparing resources such as repair parts, equipment, personnel and the like (S304). Then, the maintenance plan establishment unit 150 places an order for required resources (S306) and calculates a time needed to deliver the required resources to the site (S308). When the resources are prepared and ready to be delivered (S310), the maintenance plan establishment unit 150 calculates a time required for a repair team to arrive at the turbine (S312, S314) and a time required to fix the fault (S316) and, when the repair is completed (318), calculates a time required for the repair team to arrive at the office (S320). If the time required to fix the fault occurred in the turbine is calculated as described above, the maintenance plan establishment unit 150 orders the resources needed for the maintenance and determines a maintenance time point with reference to weather condition and availability of the resources so that maintenance for the fault occurred in the turbine can be completed within the estimated operating time.

Next, a method of establishing an offshore wind power generation maintenance plan is described with reference to FIG. 4. Referring to FIG. 4, if a turbine error stop occurs (S402), the maintenance plan establishment unit 150 informs a manager of the wind power plant and an engineer in charge about occurrence of the error after generating a turbine alarm and sets a preparation time for preparing resources such as repair parts, equipment, personnel and the like (S404). Then, the maintenance plan establishment unit 150 places an order for required resources (S406), calculates a time needed to deliver the required resources to the site (S408), and sets an estimated departure time of a repair team based on weather data. When weather condition is favorable and the resources are prepared and ready to be delivered (S410), the maintenance plan establishment unit 150 checks weather data and repair time in past five years (S412), determines the weather permits O&M team to start for repair (S414) and calculates a time required for the repair team to arrive at the turbine (S416), a time required for O&M team to arrive at turbine (S418) and a time required to fix the fault (S420) and, when the repair is completed (S422), calculates a time required for the repair team to arrive at the office (S424). Thereafter, repair equipment and personnel are withdrawn (S426). If the time required to fix the fault occurred in the turbine is calculated as described above, the maintenance plan establishment unit 150 orders the resources needed for the maintenance and determines a maintenance time point with reference to weather condition and availability of the resources so that maintenance for the fault occurred in the turbine can be completed within the estimated operating time.

The maintenance plan establishment unit 150 establishes a maintenance plan and, in addition, calculates maintenance cost (CA) using the data collected according to a wind power generation maintenance scenario. That is, the maintenance plan establishment unit 150 calculates maintenance cost (CA) using Equation 2.

$$C_A = P_A * R_A \qquad \text{[Equation 2]}$$

Here, CA denotes annual maintenance cost, PA denotes a fault occurrence probability, and RA denotes repair cost, and the repair cost includes an equipment use fee, parts cost, labor cost, transport cost and the like.

The normal state model creation unit 160 collects work environment modeling data generated in the wind power plant to create a normal state model, extracts normal data by removing noises from the collected work environment modeling data, and creates the normal state model by recognizing a pattern of the extracted normal data. Here, the work environment modeling data is data collected to create the normal state model, which may include weather data including at least one of wind speed, wind direction, temperature and pressure, work information acquired by a Supervisory Control And Data Acquisition System (SCADA System) or a Condition Monitoring System (CMS System) and the like. The normal state model is a state matrix, which may express a correlation between parameters (e.g., wind speed, load, temperature and the like). Accordingly, the normal state model creation unit 160 may create a normal state model by progressing calibration on any one of the parameters in a method of measuring work environment modeling data at a specific time point while changing any one of the parameters.

In other words, the normal state model creation unit 160 may measure work environment modeling data while changing any one of the parameters of a normal state model, extract normal data by removing noises from the measured work environment modeling data, compare the extracted normal data with predefined reference data, and create a normal state model by setting a value of a normal data having a value most similar to a value of the reference data as a value of a corresponding parameter.

If the state data created by the fault occurrence prediction unit 140 indicates that a fault has already occurred, the fault processing unit 170 schedules a maintenance plan so that the maintenance can be performed immediately. That is, the fault processing unit 170 schedules a maintenance plan such as determining a maintenance time point with reference to resources needed for maintenance of the fault, weather condition, availability of the resources, a time required to order the resources, or maintenance priorities of a plurality of faults so that the maintenance can be performed immediately.

In addition, if the state data created by the fault occurrence prediction unit 140 indicates that a fault has already occurred, the fault processing unit 170 determines whether or not a corresponding wind generator is automatically controlled and transmits an automatic control signal to a corresponding wind power generation control device or transmits alarm information to a manager terminal according to a result of the determination.

That is, if automatic control is set in the wind generator where the fault is generated or automatic control can be conducted on the wind generator, the fault processing unit 170 transmits an automatic control signal to a corresponding wind power generation control device, and if automatic control is not set or automatic control cannot be conducted, the fault processing unit 170 may transmit alarm information including a fault cause, a fault management priority, facility maintenance cost, a maintenance time point and the like to the manager terminal. Here, the automatic control signal may include a control signal for automatic maintenance such as top-up of lubricant (of a yawing gear or a pitch control gear), generator coolant or the like, a control signal for safety mode operation (pitch control or rotation speed control) and the like.

When fault history information of the wind generator is requested from the manager, the fault history management unit 180 acquires the fault history information including a fault status, a fault management priority, a fault cause, a maintenance plan and the like of the corresponding wind generator from the fault history information database 128 and provides the manager with the fault history information.

Meanwhile, each of the collection unit 130, the fault occurrence prediction unit 140, the maintenance plan establishment unit 150, the normal state model creation unit 160, the fault processing unit 170 and the fault history management unit 180 can be implemented by a processor or the like needed to execute a program on a computing device. Like this, the collection unit 130, the fault occurrence prediction unit 140, the maintenance plan establishment unit 150, the normal state model creation unit 160, the fault processing unit 170 and the fault history management unit 180 can be respectively implemented by a physically independent configuration or implemented in a form functionally separated within one processor.

The control unit 190 is a configuration for controlling operation of various configuration units of the wind power generation management apparatus 100 including the communication unit 110, the database 120, the collection unit 130, the fault occurrence prediction unit 140, the maintenance plan establishment unit 150, the normal state model creation unit 160, the fault processing unit 170 and the fault history management unit 180.

The control unit 190 may include at least one computing device, and, here, the computing device can be a general-purpose central processing unit (CPU), a programmable device element (CPLD or FPGA) implemented to be appropriate to a specific purpose, an application specific integrated circuit (ASIC) or a micro controller chip.

The configuration units that the wind power generation management apparatus 100 may include can be implemented in hardware, software or a combination of these, and two or more configuration units can be simultaneously implemented by one piece of hardware or software.

Figure 5:
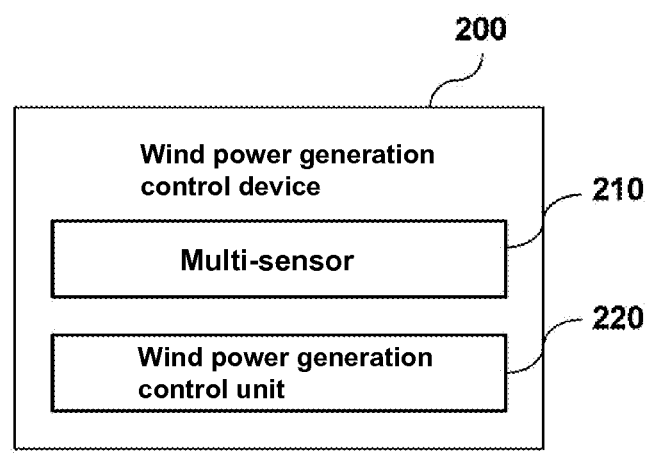
FIG. 5 is a block diagram schematically showing the configuration of a wind power generation control device according an exemplary embodiment.

FIG. 5 is a block diagram schematically showing the configuration of a wind power generation control device according an exemplary embodiment.

Referring to FIG. 5, a wind power generation control device 200 includes a multi-sensor 210 and a wind power generation control unit 220.

The multi-sensor 210 can be installed at an appropriate location in the wind generator according to a measurement object and is configured of a plurality of sensing units (not shown) for sensing or measuring the same object independently. Here, the object sensed or measured by the sensing units may include any one of wind speed, wind direction, temperature and pressure or a combination of these. Accordingly, two or more sensing units are configured to independently sense or measure the same physical quantity, and the sensing units may be, for example, an anemometer, an anemoscope, a temperature sensor or a pressure sensor. Here, the temperature sensor may be a sensor for measuring temperature of a gear box, a generator, a hydraulic device, a cooling device or the like.

The wind power generation control unit 220 may control a device controlled according to a measurement value of the multi-sensor 210 among the devices configuring the wind generator, such as a pitch drive, a yaw control device of a nacelle, a generator, a hydraulic device, a cooling device and the like.

When an automatic control signal is received from the wind power generation management apparatus, the wind power generation control unit 220 performs an operation corresponding to the automatic control signal. That is, the wind power generation control unit 220 controls a device controlled according to the automatic control signal among the devices configuring the wind generator, such as a pitch drive, a yaw control device of a nacelle, a generator, a hydraulic device, a cooling device and the like.

Because a method of controlling the wind generator according to the automatic control signal by the wind power generation control unit 220 is the same as a method of the prior art, detailed description thereof will be omitted.

Figure 6:
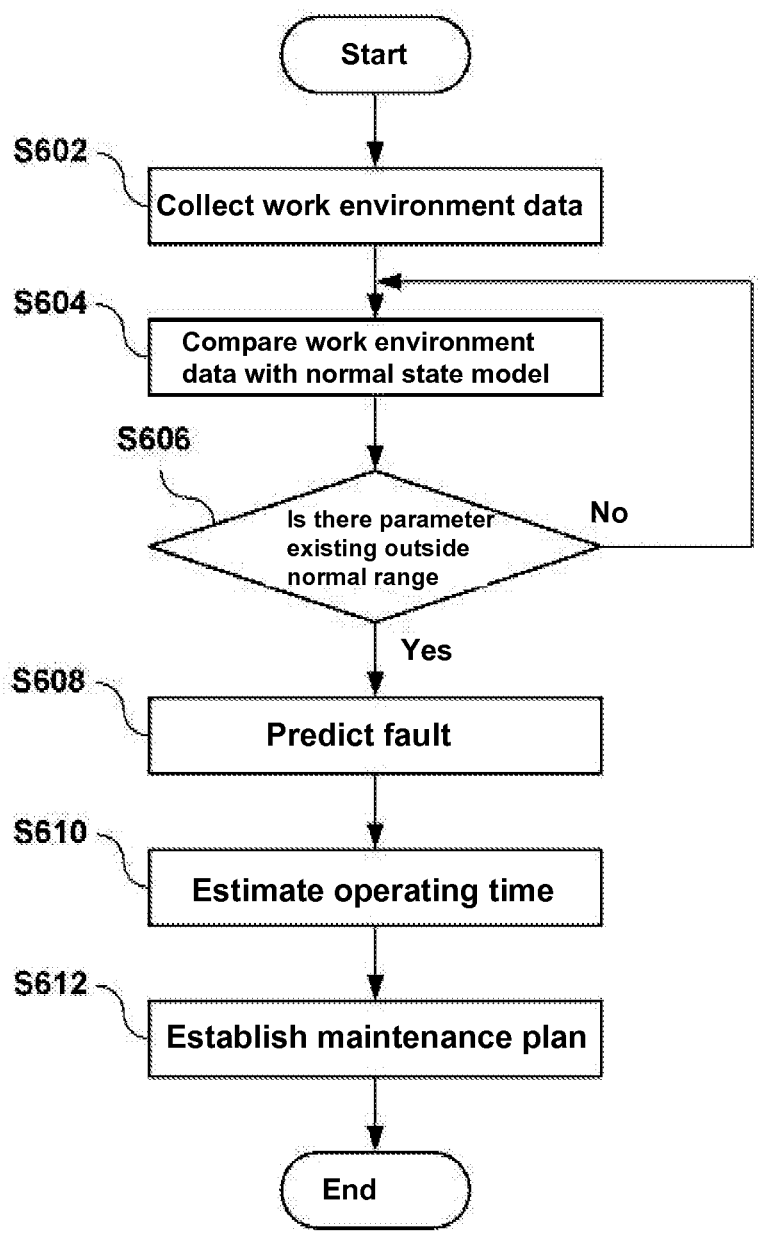
FIG. 6 is a flowchart illustrating a wind power plant management method according an exemplary embodiment.

FIG. 6 is a flowchart illustrating a wind generator management method according an exemplary embodiment.

Referring to FIG. 6, the wind power generation management apparatus collects work environment data generated in a wind power plant S602. Here, the work environment data may include weather data including wind speed, wind direction and the like, work information (e.g., including a pitch angle and a yaw angle of a blade provided in the wind generator, a work diary, work environment information and the like) acquired by the SCADA System or the CMS System, and the like.

The wind power generation management apparatus compares the collected work environment data with a predefined normal state model S604 and determines whether or not there is a parameter existing outside a normal range S606.

If there is a parameter existing outside a normal range as a result of the determination at S606, the wind power generation management apparatus predicts occurrence of a fault in the wind power plant based on a trend of the corresponding parameter S608.

Then, the wind power generation management apparatus estimates an operating time which lasts until the predicted fault occurs S608 and establishes a maintenance plan which can be performed for the fault during the estimated operating time S612. At this point, the wind power generation management apparatus may estimate the operating time which lasts until the fault occurs based on generator operation history and generator management performance (track records) stored in the operating time information database. Then, the wind power generation management apparatus may establish a maintenance plan considering available equipment, resources, a fault management priority, weather condition (wave height and the like), the operating time and the like. Therefore, the maintenance can be performed within the operating time before the fault occurs according to the established maintenance plan.

Such a wind power plant management method can be created as a program, and codes and code segments configuring the program can be easily inferred by the programmers in the art. In addition, the program related to the wind power plant management method can be stored in an information storage medium which can be read by an electronic device, and the program can be read and executed by the electronic device.

Those skilled in the art may understand that the inventive concept can be embodied in other specific forms without departing from technical spirits and essential characteristics of the disclosure. Therefore, the exemplary embodiments described above are illustrative and not restrictive in all respects. The scope of the inventive concept should be determined by the appended claims rather than the detailed description, and the meaning and scope of the claims and all changed and modified forms derived from the equivalent concepts thereof should be interpreted to be included in the scope of the disclosure.

Further, the embodiments discussed have been presented by way of example only and not limitation. Thus, the breadth and scope of the inventive concepts should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

What is claimed is:

1. A wind power generation management apparatus comprising at least one hardware processor respectively connected to a normal state model database and an operating time information database and configured to implement:
a collector configured to collect first data measured in real-time in a wind power plant, the collector comprising a multi-sensor (210) including a plurality of sensors that are respectively installed at locations in the wind power plant and include an anemometer, an anemoscope, a temperature sensor, and a pressure sensor, the plurality of sensors respectively configured to obtain a measurement object of the wind power plant corresponding to each of a plurality of parameters including wind speed, wind direction, temperature, load, and pressure;
a normal state modeler configured to create a predefined normal state model expressing a correlation between the plurality of parameters and to store the predefined normal state model in the normal state model database, the normal state model being created by setting a value of a corresponding parameter among the plurality of parameters, the set value of the corresponding parameter being a value of normal data that is most similar to a value of predefined reference data;
a fault occurrence predictor configured
to compare the collected first data with the stored predefined normal state model of the corresponding parameter to determine whether the collected first data exists outside a normal range,
to create second data indicating a state of the wind power plant if the corresponding parameter of the first data exists outside the normal range, the second data including fault occurrence prediction data indicating possibility of fault occurrence in the wind power plant based on a trend of the corresponding parameter,
to predict occurrence of a fault in the wind power plant according to the second data, and
to store an operating time for prediction data of each fault occurrence in the operating time information database, the stored operating times based on generator operation history and a track record of generator management performance; and
a maintenance plan generator configured to generate an estimated operating time corresponding to a time from a start of the wind power plant until the fault occurs based on the second data and the operating times stored in the operating time information database, and to generate a maintenance plan to complete maintenance for the fault within the estimated operating time,
wherein the normal state modeler is further configured to collect third data as work environment modeling data generated in the wind power plant in order to create the predefined normal state model and to extract fourth data as the normal data by removing noise from the collected third data, and
wherein the created normal state model is based on a pattern of the extracted fourth data, the pattern of the extracted fourth data determined by measuring the work environment modeling data for each of the plurality of parameters of the stored normal state model and comparing the extracted normal data with the predefined reference data.

2. The apparatus according to claim 1, wherein the first data comprises:
weather data comprising the at least one of wind speed, wind direction, temperature and pressure of the wind power plant and
work information acquired by a Supervisory Control And Data Acquisition System (SCADA System) or a Condition Monitoring System (CMS System).

3. The apparatus according to claim 1, wherein the maintenance plan generator is further configured to calculate maintenance cost for the generated maintenance plan based on at least one of a fault occurrence probability, an equipment use fee, parts cost, labor cost and transport cost.

4. The apparatus according to claim 1,
wherein the at least one hardware processor is further connected to a resource information database for storing information on available resources, and
wherein the maintenance plan generator is further configured to determine a maintenance time point based on the operating time with reference to the stored information on available resources, resources needed for maintenance of the fault, weather condition, and maintenance priorities of a plurality of faults so that maintenance for the fault can be completed within the estimated operating time.

5. The apparatus according to claim 1,
wherein the at least one hardware processor is further connected to a resource information database for storing information on available resources, and
wherein the at least one hardware processor is further configured to implement
a fault processor configured to determine a maintenance time point with reference to the stored information on available resources, resources needed for maintenance of the fault, weather condition, maintenance priorities of a plurality of faults so that the maintenance can be performed immediately in response to state data indicating that a fault has already occurred.

6. The apparatus according to claim 1, wherein the at least one hardware processor is further configured to implement
a fault history manager configured to provide fault history information including at least one of a fault status, a fault management priority, a fault cause and a maintenance plan in response to the fault history information of a wind generator of the wind power plant being requested.

7. The apparatus according to claim 1, wherein the plurality of sensors include two or more sensors configured to independently measure a same physical quantity among the at least one of wind speed, wind direction, temperature, and pressure; and wherein the measurement object corresponding to a temperature includes a temperature of at least one of a gear box, a generator, a hydraulic device, and a cooling device of the wind power plant.

* * * * *